United States Patent
Ashmore et al.

(10) Patent No.: US 7,842,656 B2
(45) Date of Patent: Nov. 30, 2010

(54) WOOD TREATMENT METHOD

(75) Inventors: John William Ashmore, Lansdale, PA (US); David Michael Laganella, Swedesboro, NJ (US); Tirthankar Ghosh, Oreland, PA (US); Nilesh Shah, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 330 days.

(21) Appl. No.: 11/895,118

(22) Filed: Aug. 23, 2007

(65) Prior Publication Data

US 2008/0072791 A1 Mar. 27, 2008

Related U.S. Application Data

(60) Provisional application No. 60/846,653, filed on Sep. 22, 2006.

(51) Int. Cl.
| | |
|---|---|
| C11D 9/50 | (2006.01) |
| C11D 3/395 | (2006.01) |
| C11D 3/37 | (2006.01) |
| C11D 3/28 | (2006.01) |
| C11D 7/02 | (2006.01) |

(52) U.S. Cl. .............. 510/382; 510/199; 510/475; 510/476; 510/500; 510/508

(58) Field of Classification Search ........... 510/199, 510/382, 475, 476, 500, 508
See application file for complete search history.

(56) References Cited

U.S. PATENT DOCUMENTS

| | | | |
|---|---|---|---|
| 4,420,542 A | 12/1983 | Sowers | |
| 4,737,491 A | 4/1988 | Leppaevuori et al. | |
| 5,186,947 A | 2/1993 | Goettsche et al. | |
| 6,107,397 A * | 8/2000 | Blankenburg et al. | ....... 524/813 |
| 6,469,097 B1 | 10/2002 | Bett et al. | |
| 2004/0016909 A1 | 1/2004 | Zhang et al. | |
| 2004/0258768 A1* | 12/2004 | Richardson et al. | ......... 424/630 |
| 2005/0003163 A1* | 1/2005 | Krishnan | .................. 428/190 |
| 2005/0227895 A1 | 10/2005 | Ghosh et al. | |

FOREIGN PATENT DOCUMENTS

GB 1281911 7/1972

* cited by examiner

*Primary Examiner*—Vasu Jagannathan
*Assistant Examiner*—Karuna P Reddy
(74) *Attorney, Agent, or Firm*—Kenneth Crimaldi

(57) ABSTRACT

A method for treating wood to inhibit leaching of copper compounds into the environment. The method comprises treating the wood with a copper-containing wood preservative and a latex copolymer.

9 Claims, No Drawings

WOOD TREATMENT METHOD

This application claims the benefit of priority under 35 U.S.C. §119(e) of U.S. Provisional Patent Application No. 60/846,653 filed on Sep. 22, 2006.

The present invention relates to a wood treatment method in which wood is treated with a latex copolymer composition and at least one copper-containing wood preservative.

Wood treated with the current copper-based wood preservatives tends to leach copper into the environment too easily. A method for controlling copper leaching would be beneficial. Use of polyvinylpyridines complexed with copper as wood preservatives is disclosed in U.S. Pat. No. 4,420,542. However, this reference does not teach a method for reducing leaching of copper from treated wood. there is a need for other wood preservatives For environmental, health and safety reasons it is desirable to minimize the leaching of copper from treated wood. Accordingly, the problem addressed by this invention is to reduce leaching of copper from wood containing copper-based preservatives.

The present invention is directed to a method for treating wood. The method comprises adding to wood: (a) a copper-containing wood preservative; and (b) a latex copolymer comprising polymerized units of a monomer X and a monomer Y; wherein the latex copolymer comprises at least 5 wt % of monomer X derived units; wherein the latex copolymer comprises no more than 1,000 ppm of residual monomer X; wherein monomer X is selected from vinylimidazoles, vinylimidazolines, vinylpyridines, vinylpyrroles, vinylpyrrolidones, vinylcaprolactams, derivatives thereof and combinations thereof; and wherein monomer Y is selected from carboxylic acids, carboxylic acid salts, carboxylic acid esters, organosulfuric acids, organosulfuric acid salts, sulfonic acids, sulfonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof. In one embodiment of the invention, the latex copolymer is added to treated wood containing a copper-containing wood preservative. In another embodiment of the invention, the latex copolymer and the copper-containing wood preservative are added to the wood simultaneously.

Treatment of wood is performed by contacting the wood with the latex copolymer described herein, preferably under conditions specified in AWPA Standards T1-05, N1-04, N2-04 and references cited therein. Preferably, the amount of copolymer in the aqueous solution used to treat the wood (as wt % of solution) is at least 0.05%, alternatively at least 0.1%, alternatively at least 0.3%, alternatively at least 0.5%. Preferably, the amount of copolymer is no more than 5%, alternatively no more than 3%, alternatively no more than 2%, alternatively no more than 1.5%.

The term "copolymer" as used herein and in the appended claims refers to polymers polymerized from at least two different monomers.

The term "aqueous" as used herein and in the appended claims means water and mixtures composed substantially of water and water miscible solvents.

The use of the term "(meth)" followed by another term such as acrylic, acrylate, acrylamide, etc., as used herein and in the appended claims, refers to, for example, both acrylic and methacrylic; acrylate and methacrylate; acrylamide and methacrylamide; etc.

The glass transition temperature ("Tg") for the copolymers and pressure sensitive adhesive formulations of the present invention may be measured by differential scanning calorimetry (DSC) taking the mid-point in the heat flow versus temperature transition as the Tg value.

The term "residual monomer X" as used herein and in the appended claims means unpolymerized monomer based on the total latex. The residual monomer concentration is determined using well known gas chromatography methods.

In some embodiments of the present invention, the latex copolymer comprises at least 10 wt % of monomer X derived units. In some aspects of these embodiments, the latex copolymer comprises at least 15 wt % of monomer X derived units. In some aspects of these embodiments, the latex copolymer comprises at least 20 wt % of monomer X derived units. In some aspects of these embodiments, the latex copolymer comprises at least 25 wt % of monomer X derived units. In some aspects of these embodiments, the latex copolymer comprises at least 28 wt % of monomer X derived units. In some aspects of these embodiments, the latex copolymer comprises no more than 35 wt % of monomer X derived units, alternatively no more than 32%.

In some embodiments of the present invention, the latex copolymer comprises no more than 1,000 ppm of residual monomer X. In some aspects of these embodiments, the latex copolymer comprises no more than 900 ppm of residual monomer X. In some aspects of these embodiments, the latex copolymer comprises no more than 800 ppm of residual monomer X. In some aspects of these embodiments, the latex copolymer comprises no more than 700 ppm of residual monomer X. In some aspects of these embodiments, the latex copolymer comprises no more than 600 ppm of residual monomer X. In some aspects of these embodiments, the latex copolymer comprises no more than 500 ppm of residual monomer X. In some aspects of these embodiments, the latex copolymer comprises no more than 400 ppm of residual monomer X.

In some embodiments of the present invention, monomer X is selected from vinylimidazoles, vinylimidazolines, vinylpyridines, vinylpyrroles, vinylpyrrolidones, vinylcaprolactams, derivatives thereof and combinations thereof. In some aspects of these embodiments, monomer X is selected from vinylimidazoles, vinylpyridines, derivatives thereof and combinations thereof. In some aspects of these embodiments, monomer X is selected from N-vinylimidazole, 2-vinylpyridine, 4-vinylpyridine and combinations thereof. In some aspects of these embodiments, monomer X is N-vinylimidazole.

In some embodiments of the present invention, monomer Y is selected from carboxylic acids, carboxylic acid salts, carboxylic acid esters, organosulfuric acids, organosulfuric acid salts, sulfonic acids, sulfonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof. In some aspects of these embodiments, monomer Y is selected from carboxylic acids, carboxylic acid esters (e.g., alkyl (meth)acrylates), (meth)acrylamides, $C_8$-$C_{20}$ aromatic monomers containing at least one exocyclic ethylenic unsaturation and combinations thereof. In some aspects of these embodiments, monomer Y is selected from acrylic acid, methacrylic acid, itaconic acid, maleic acid, fumaric acid, methyl (meth)acrylate, ethyl (meth)acrylate, propyl (meth)acrylate, isopropyl acrylate, n-butyl (meth)acrylate, isobutyl (meth)acrylate, 2-ethylhexyl (meth)acrylate, decyl (meth)acrylate, lauryl (meth)acrylate, stearyl (meth)acrylate, styrene, vinyltoluene, α-methylstyrene and combinations thereof. In some aspects of these embodiments, monomer Y is n-butyl (meth)acrylate.

In some embodiments of the present invention, the method uses a latex copolymer comprising polymerized units of a monomer X and a monomer Y; wherein the latex copolymer comprises at least 5 wt % of monomer X derived units; wherein the latex copolymer comprises no more than 1,000 ppm of residual monomer X; wherein monomer X is selected from vinylimidazoles, vinylimidazolines, vinylpyridines, vinylpyrroles, vinylpyrrolidones, vinylcaprolactams, derivatives thereof and combinations thereof; and wherein monomer Y is selected from carboxylic acids, carboxylic acid salts, carboxylic acid esters, organosulfuric acids, organosulfuric acid salts, sulfonic acids, sulfonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof; and with the proviso that the composition comprises no more than 5 wt % of units derived from ethylenically unsaturated monomer containing an epoxide function. In some aspects of these embodiments, the latex copolymer comprises no more than 1 wt % of units derived from ethylenically unsaturated monomer containing an epoxide function. In some aspects of these embodiments, the latex copolymer comprises no more than 0.5 wt % of units derived from ethylenically unsaturated monomer containing an epoxide function. In some aspects of these embodiments, the latex copolymer comprises no more than 0.1 wt % of units derived from ethylenically unsaturated monomer containing an epoxide function. In some aspects of these embodiments, the latex copolymer comprises no more than 0.05 wt % of units derived from ethylenically unsaturated monomer containing an epoxide function.

In some embodiments of the present invention, the composition comprising a latex copolymer has a pH of at least 7. In some aspects of these embodiments, the composition has a pH of 7-10. In some aspects of these embodiments, the composition has a pH of at least 8. In some aspects of these embodiments, the composition has a pH of 8-10. In some aspects of these embodiments, the composition has a pH of at least 9. In some aspects of these embodiments, the composition has a pH of 9-10.

In some embodiments of the present invention, the composition comprising a latex copolymer comprises at least 20 wt % solids. In some aspects of these embodiments, the composition comprises at least 25 wt % solids. In some aspects of these embodiments, the composition comprises at least 30 wt % solids.

In some embodiments of the present invention, the composition comprises from 5 to 50 wt % of polymerized units derived from monomer X and 95 to 50 wt % of polymerized units derived from monomer Y. In some aspects of these embodiments, the composition comprises from 5 to 30 wt % of polymerized units derived from monomer X and 95 to 70 wt % of polymerized units derived from monomer Y.

In some embodiments of the present invention, the composition comprises polymerized units derived from a crosslinker. Crosslinkers suitable for use with the present invention include multi-ethylenically unsaturated monomers. In some aspects of these embodiments, the crosslinker derived units are derived from crosslinker selected from 1,4-butanediol diacrylate; 1,4-butanediol dimethacrylate; 1,6-hexanediol diacrylate; 1,1,1-trimethylol propane triacrylate; 1,1,1-trimethylol propane trimethacrylate; allyl methacrylate; divinylbenzene; and N-allyl acrylamide. In some aspects of these embodiments, the crosslinker derived units are derived from crosslinker selected from 1,1,1-trimethylol propane trimethacrylate. In some aspects of these embodiments, the composition comprises 0.01 to 10 wt % (based on solids) crosslinker. In some aspects of these embodiments, the composition comprises 0.01 to 5 wt % (based on solids) crosslinker. In some aspects of these embodiments, the composition comprises 0.01 to 1 wt % (based on solids) crosslinker.

In some embodiments of the present invention, the composition further comprises a chain transfer agent and/or the degradation products of a chain transfer agent. In some aspects of these embodiments, the chain transfer agent is selected from any conventional chain transfer agent that is compatible with the composition. In some aspects of these embodiments, the chain transfer agent is selected from t-dodecyl mercaptan, n-dodecyl mercaptan, hexanethiol, methyl mercaptopropionate and combinations thereof.

In some embodiments of the present invention, the composition of the present invention further comprises a surfactant and/or the degradation products of a surfactant. In some aspects of these embodiments, the surfactant may be any conventional surfactant that is compatible with the composition. In some aspects of these embodiments, the surfactant is selected from sodium lauryl sulfate, sodium laurylbenzenesulfonate, sodium dioctylsulfosuccinate, sodium polyoxyethylene lauryl ether sulfate and combinations thereof.

Any copper-containing wood preservative is suitable for use in this invention. In one embodiment of the invention, the copper-containing wood preservative contains at least 0.1% copper. In one embodiment of the invention, wood is treated to attain a minimum level of 0.1% copper, based on the weight of dry treated wood. In one embodiment, the maximum level of copper in the wood is 1.5%. Preferred copper-containing wood preservatives include copper azole, copper ACQ, copper HDO, IMPRALIT KDS, versions of these preservatives that contain micronized copper, or combinations thereof. In one embodiment of the invention, the preservative is copper azole or copper ACQ.

Some embodiments of the present invention will now be described in detail in the following Examples. All fractions and percentages set forth below in the Examples are by weight unless otherwise specified. The following abbreviations are used in the Examples:

BA—butyl acrylate
BOM—based on monomer
DI—deionized
DSC—differential scanning calorimetry
EA—ethyl acrylate
GC—gas chromatography
GPC—gel permeation chromatography
nDDM—n-dodecyl mercaptan
N,N-MBA—N,N-methylene bisacrylamide
SLS—sodium lauryl sulfate
Tg—glass transition temperature
TMPTA—trimethylolpropane triacrylate
VAZO® 68 free radical initiator—4,4'-azobis(4-cyanovaleric acid) available from DuPont
VI—1-vinyl imidazole

EXAMPLES 1-8

Synthesis of a Latex Copolymer (w/Seed)

DI water (183.86 g) and a 32.6%, 58 nm seed latex (23.02 g) were charged to a 1,000 mL reactor flask equipped with a mechanical stirrer, thermometer, temperature controlled, heating mantel, condenser and nitrogen sweep. The contents of the reactor flask were heated to 85° C.

In a separate container, BA (105.0 g), n-DDM (amount indicated in Table 1), DI water (94.29 g) and 28% SLS (10.71 g) were combined. The contents of this container were then emulsified in a high speed rotor stator mixer to form a monomer emulsion.

In another container, VI (45 g), VAZO® 68 free radical initiator (2.25 g), DI water (54.0 g), and 1N NaOH solution (17.76 g) were combined to form an aqueous feed solution.

The monomer emulsion and the aqueous feed solution were then fed separately to the reactor flask while maintaining the temperature of the reactor flask contents at 85° C. The feeds of the monomer emulsion and aqueous feed solution to the reactor flask were started simultaneously. The monomer emulsion fed then continued for 45 minutes while the aqueous feed solution feed continued for 90 minutes. Following the end of the aqueous feed solution feed, the contents of the reactor flask were held at 85° C. for an additional 2.5 hours for a total reaction time of 4 hours giving a product latex copolymer.

The solids content, as determined by gravimetry; the residual monomer content, as determined by GC; the particle size, as determined by light scattering particle size analysis; and the molecular weight, as determined by GPC, of the latex copolymers are reported in Table 1. The Tg of the dried copolymer, as determined by DSC, is also reported in Table 1.

particle size, as determined by light scattering particle size analysis of the latex copolymer are reported in Table 2. The Tg of the dried copolymer, as determined by DSC, is also reported in Table 2.

TABLE 2

| Ex. | BA (g) | VI (g) | TMPTA (g) | Solids (wt %) | Residual Monomer | | Particle size (nm) | Tg (° C.) |
| | | | | | BA (ppm) | VI (ppm) | | |
| --- | --- | --- | --- | --- | --- | --- | --- | --- |
| 9 | 112.5 | 37.5 | 0.0 | 24.54 | 917 | 867 | 71 | −5 |
| 10 | 97.5 | 37.5 | 15.0 | 31.10 | 440 | 600 | 98 | 27 |
| 11 | 97.5 | 37.5 | 15.0 | 30.60 | 292 | 504 | 174 | 23 |
| 12 | 90.0 | 45.0 | 15.0 | 28.50 | 509 | 545 | 302 | 45 |

EXAMPLE 13-19

Synthesis of a Latex Copolymer (w/Seed)

DI water (255.42 g), 28% SLS (10.72 g) and a 32.6%, 58 nm seed latex (58.93 g) were charged to a 1,000 mL reactor

TABLE 1

| Ex. | n-DDM (g) | Solids (wt %) | Residual Monomer | | Particle size (nm) | Mw (g/mol) | Mn (g/mol) | Tg (° C.) |
| | | | BA (ppm) | VI (ppm) | | | | |
| --- | --- | --- | --- | --- | --- | --- | --- | --- |
| 1 | 0.0 | 30.64 | 339 | 540 | 171 | — | — | — |
| 2 | 1.5 | 31.47 | 297 | 395 | 163 | 11,922 | 7,631 | 13 |
| 3 | 3.0 | 30.72 | 349 | 300 | 163 | 10,128 | 6,856 | 6 |
| 4 | 4.5 | 31.25 | 452 | 376 | 166 | 7,674 | 5,693 | −6 |
| 5 | 6.0 | 29.22 | 403 | 473 | 166 | 4,764 | 3,985 | −9 |
| 6 | 7.5 | 31.04 | 410 | 315 | 164 | 4,984 | 4,044 | −16 |
| 7 | 3.0 | 30.37 | 320 | 352 | 157 | — | — | — |
| 8 | 1.5 | 30.05 | 552 | 474 | 159 | — | — | — |

EXAMPLES 9-12

Synthesis of a Latex Copolymer (w/o Seed)

DI water (253.4 g) and 28% SLS (10.72 g) were charged to a 1,000 mL round bottomed reactor flask equipped with a mechanical stirrer, thermometer, temperature controller, heating mantle, condenser and nitrogen sweep. The contents of the reactor flask were heated with agitation to 85° C.

In a separate container, BA (amount indicated in Table 2), VI (amount indicated in Table 2) and TMPTA (amount indicated in Table 2) were combined to form a monomer mix.

In another container, VAZO® 68 free radical initiator (1.50 g), DI water (73.5 g) and 1N NaOH (10.70 g) were combined to form an aqueous initiator solution.

The monomer mix and the aqueous initiator solution were then fed separately to the reactor flask while maintaining the temperature of the reactor flask contents at 85° C. The feeds of the monomer mix and aqueous initiator solution to the reactor flask were started simultaneously. The monomer mix feed then continued for 30 minutes while the aqueous initiator solution feed continued for 60 minutes. Following the end of the aqueous initiator solution feed, the contents of the reactor flask were held at 85° C. for an additional 2.0 hours for a total reaction time of 3.0 hours giving a product latex copolymer.

The solids content, as determined by gravimetry; the residual monomer content, as determined by GC; and the flask equipped with a mechanical stirrer, thermometer, temperature controlled, heating mantel, condenser and nitrogen sweep. The contents of the reactor flask were heated to 85° C.

In a separate container, BA (amount indicated in Table 3), VI (amount indicated in Table 3) and TMPTA (amount indicated in Table 3) were combined to form a monomer mix.

In another container, VAZO® 68 free radical initiator (1.50 g), DI water (73.5 g) and 1N NaOH (11.77 g) were combined to form an aqueous initiator solution.

The monomer mix and the aqueous initiator solution were then fed separately to the reactor flask while maintaining the temperature of the reactor flask contents at 85° C. The feeds of the monomer mix and aqueous initiator solution to the reactor flask were started simultaneously. The monomer mix feed then continued for 30 minutes while the aqueous initiator solution feed continued for 60 minutes. Following the end of the aqueous initiator solution feed, the contents of the reactor flask were held at 85° C. for an additional 2.0 hours for a total reaction time of 3.0 hours giving a product latex copolymer.

The solids content, as determined by gravimetry; the residual monomer content, as determined by GC; and, the particle size, as determined by light scattering particle size analysis of the latex copolymer are reported in Table 3. The Tg of the dried copolymer, as determined by DSC, is also reported in Table 3.

TABLE 3

| Ex. | BA (g) | VI (g) | TMPTA (g) | Solids (wt %) | Residual Monomer BA (ppm) | Residual Monomer VI (ppm) | Particle size (nm) | Tg (° C.) |
|---|---|---|---|---|---|---|---|---|
| 13 | 120 | 15 | 15 | 30.28 | 552 | 26 | 117 | −20 |
| 14 | 105 | 30 | 15 | 30.95 | 652 | 330 | 116 | −14 |
| 15 | 90 | 45 | 15 | 31.18 | 641 | 298 | 119 | 45 |
| 16 | 105 | 45 | 0 | 30.95 | 878 | 280 | 122 | 16 |
| 17 | 60 | 45 | 45 | 30.67 | 118 | 300 | 163 | 102 |
| 18 | 105 | 22.5 | 22.5 | 30.88 | 260 | 391 | 117 | 15 |
| 19 | 105.0 | 22.5 | 22.5 | 31.03 | 247 | 355 | 116 | 12 |

EXAMPLES 20-22

Synthesis of a Latex Copolymer

DI water (379.63 g) and 28% SLS (16.07 g) were charged to a 1,000 mL round bottomed reactor flask equipped with a mechanical stirrer, thermometer, temperature controller, heating mantel, condenser and nitrogen sweep. The contents of the reactor flask were heated with agitation to 85° C.

In a separate container, EA (157.5 g), VI (67.5) and N,N-MBA (amount indicated in Table 4) were combined to form a monomer mix.

In another container, VAZO® 68 free radical initiator (2.25 g), DI water (110.25 g) and 1N NaOH (17.66 g) were combined to form an aqueous initiator solution.

The monomer mix and the aqueous initiator solution were then fed separately to the reactor flask while maintaining the temperature of the reactor flask contents at 85° C. The feeds of the monomer mix and aqueous initiator solution to the reactor flask were started simultaneously. The monomer mix feed then continued for 60 minutes while the aqueous initiator solution feed continued for 120 minutes. Following the end of the aqueous initiator solution feed, the contents of the reactor flask were held at 85° C. for an additional hour for a total reaction time of 3.0 hours giving a product latex copolymer.

The solids content, as determined by gravimetry; the residual monomer content, as determined by GC; and the particle size, as determined by light scattering particle size analysis of the latex copolymer are reported in Table 4.

TABLE 4

| Ex. | NN-MBA (g) | Solids (wt %) | Residual Monomer EA (ppm) | Residual Monomer VI (ppm) | Particle size (nm) |
|---|---|---|---|---|---|
| 20 | 0.45 | 30.5 | 1435 | 1043 | 242 |
| 21 | 0.45 | 30.0 | 713 | 542 | 222 |
| 22 | 1.13 | 20.6 | 673 | 219 | 242 |

EXAMPLE 23

Wood Treatment with Latex Copolymers

Wood was treated with a 1000 ppm copper-containing preservative solution via vacuum-pressure treatment. Southern Yellow Pine wood cubes (conditioned to constant weight in a constant temperature and humidity room), measuring 19 mm, were placed in a pressure cylinder, and weighed down with a stainless steel screen and enough stainless steel nuts to prevent the cubes from floating in the aqueous treatment solution. Enough treatment solution was added to completely cover the cubes and the pressure in the cylinder was reduced to approximately 125 mm Hg (approximately 16.7 kPa) for 20 minutes. After this time, the cylinder was pressurized with nitrogen gas to 150 psig (1135 kPa absolute pressure). The pressure was maintained for 30 minutes, then released, the cubes removed, and reconditioned to constant weight in the same constant temperature and humidity room. The reconditioned cubes were then treated with an aqueous solution of the latex polymer via the same treatment process as noted above. Once the subsequently treated cubes had reconditioned to constant weight, they were used in the leaching assay. If the copper treated cubes were dip treated with the latex polymer, they were submerged in the latex polymer solution for 2 minutes, removed then resubmerged for 10 minutes before they were removed and reconditioned to constant weight. 0.1-1% Aqueous solutions of latex copolymers prepared in Examples 1, 2 and 5 were applied to the treated wood, either via a pressure treatment, or by dipping the wood into the solution, as indicated below. The AWPA E11-97 leaching assay was used to analyze leachate for copper content. The results are presented below in Tables 5 and 6.

TABLE 5

| Wood Treatment | Total Cu in Leachate |
|---|---|
| 1000 ppm Cu (ACQ type D) | 29% |
| 1000 ppm Cu (ACQ type D) + 1% Ex. 1 (pressure) | 11% |
| 1000 ppm Cu (ACQ type D) + 1% Ex. 2 (pressure) | 5.5% |
| 1000 ppm Cu (ACQ type D) + 1% Ex. 5 (pressure) | 4.9% |
| 1000 ppm Cu (ACQ type D) + 1% Ex. 5 (dip) | 14% |

TABLE 6

| Wood Treatment | Total Cu in Leachate |
|---|---|
| 1000 ppm Cu (ACQ type D) | 17% |
| 1000 ppm Cu (ACQ type D) + 1% Ex. 5 (pressure) | 0.8% |
| 1000 ppm Cu (ACQ type D) + 0.3% Ex. 5 (pressure) | 5.6% |
| 1000 ppm Cu (ACQ type D) + 0.1% Ex. 5 (pressure) | 9.5% |

The invention claimed is:

1. A method for treating wood; said method comprising adding to wood:
   (a) a copper-containing wood preservative; and
   (b) a latex copolymer comprising polymerized units of a monomer X and a monomer Y;
   wherein the latex copolymer comprises at least 5 wt % of monomer X derived units;
   wherein the latex copolymer comprises no more than 1,000 ppm residual monomer X;
   wherein monomer X is N-vinylimidazole;
   wherein monomer Y is selected from carboxylic acids, carboxylic acid salts, carboxylic acid esters, organosulfuric acids, organosulfuric acid salts, sulfonic acids, sulfonic acid salts, phosphonic acids, phosphonic acid salts, vinyl esters, (meth)acrylamides, $C_8$-$C_{20}$ aromatic monomers containing at least one exocyclic ethylenic unsaturation or combinations thereof.

2. The method of claim 1, wherein the latex copolymer comprises >5 to 50 wt % of units derived from monomer X and 95 to 50 wt % of units derived from monomer Y.

3. The method of claim 1, wherein the latex copolymer comprises 25 to 50 wt % of units derived from monomer X and 75 to 50 wt % of units derived from monomer Y.

4. The method of claim 3 wherein monomer Y is selected from carboxylic acids, carboxylic acid esters or combinations thereof.

5. The method of claim 4, wherein monomer Y is at least one alkyl (meth)acrylate.

6. The method of claim 5, wherein the latex copolymer is added to treated wood containing a copper-containing wood preservative.

7. The method of claim 6, wherein the latex copolymer is added in an amount from 0.05 wt % to 2 wt %.

8. The method of claim 7, wherein monomer Y is butyl acrylate.

9. The method of claim 1 wherein the latex copolymer is added to treated wood containing a copper-containing wood preservative.

* * * * *